Sept. 4, 1934.  H. KARL  1,972,404
DEVICE ON VEHICLES FOR PROTECTING PEDESTRIANS
Filed Sept. 2, 1930
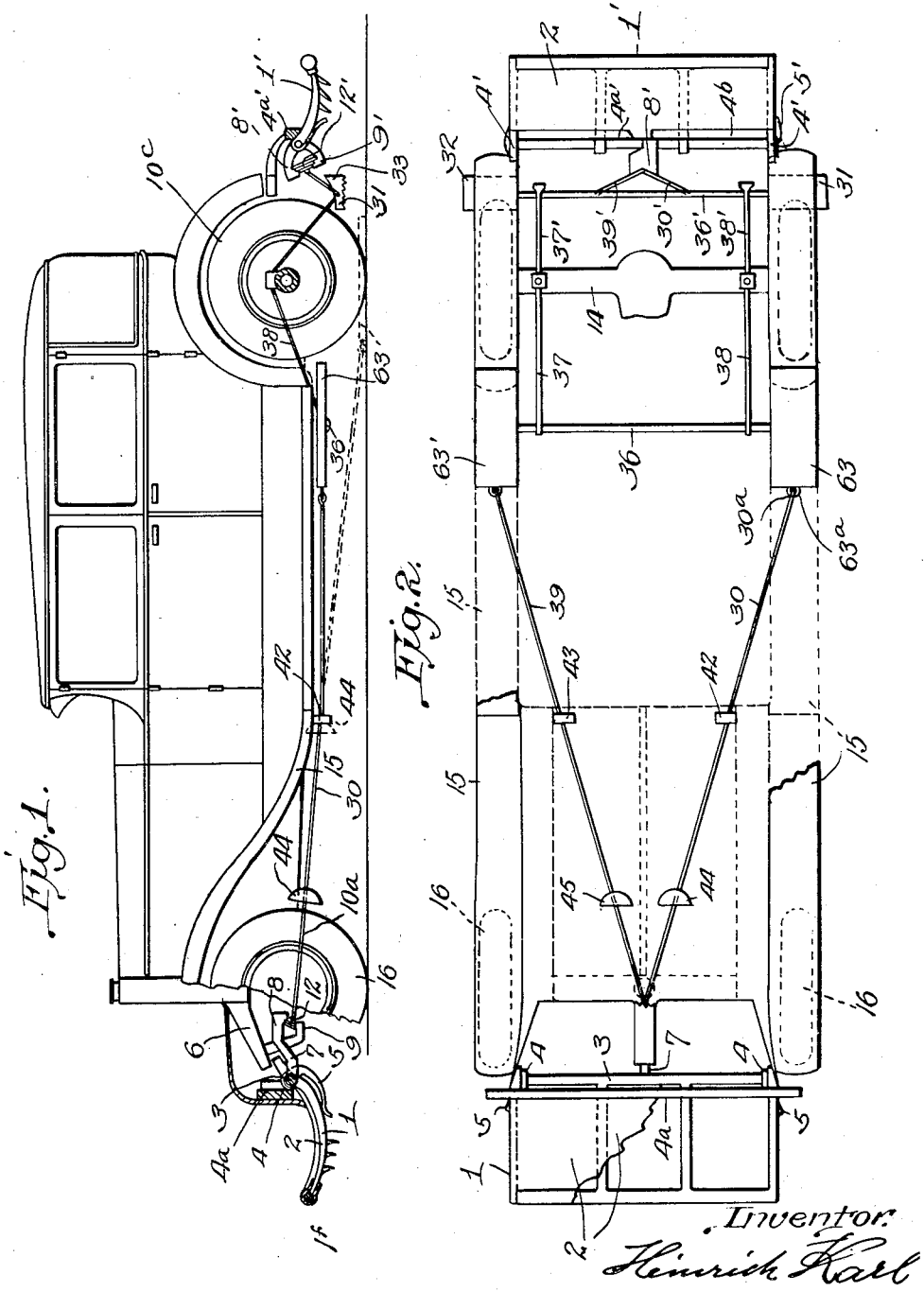

Patented Sept. 4, 1934

1,972,404

UNITED STATES PATENT OFFICE 1,972,404

DEVICE ON VEHICLES FOR PROTECTING PEDESTRIANS

Heinrich Karl, Jersey City, N. J.

Application September 2, 1930, Serial No. 479,200

2 Claims. (Cl. 180—83)

This invention relates to devices for installation on vehicles and serves for the protection of pedestrians from being run over by the wheels of the vehicles and from being seriously hurt by the moving vehicles when the pedestrians approach them too near from the side. The invention also has relation to the similar invention which forms an application for patent whose Serial No. is 479,201 which was filed simultaneously with this application on September 2, 1930, and allowed under date of December 2, 1931.

More particularly the present application contemplates a device in front of the vehicle (a similar device might be installed also at the rear of the vehicle) and consists of a bent forwardly extended and horizontally held stretcher-like frame of the kind known in the art and which is covered with cloth or with a net and which is so fastened to the vehicle body that it will move down somewhat when a person falls upon it, for which purpose it is created. Connected therewith are such novel mechanisms that will exert a braking action upon the vehicle after a person falls upon said stretcher-like structure. The mechanisms which cause that function are similar to those employed in connection with the same function which is shown and described in the application which will be filed simultaneously with this application, and these mechanisms consist first of pieces of strong leather, such as sole leather or of a tough fabric, that are held in suspended position before the rear wheels of the automobile, etc., and which are dropped to the ground at the moment a person falls upon said stretcher-like part (or fender). The rear wheels thus are compelled to move upon said leather pieces when the automobile, etc. is in forward motion whereby the cords, chains, or wires that before held said pieces of leather in suspended position now hold said pieces of leather, etc. in the position in which the rear wheels must stay upon them so that they cannot grip the ground but have to move always upon said pieces of leather. The result is that said automobile, etc. cannot move forward and is practically stopped until it moves backward so that the pieces of leather can be lifted and put into suspended position again. This invention comprises therefore also mechanisms for holding said pieces of leather, etc. in suspended position and for releasing them and it comprises also such means that prevent these pieces of leather from moving out of the path of the rear wheels of the automobile, etc. when the automobile is or was in forward motion. Furthermore, this invention comprises also devices for stopping the automobile or other horseless vehicle when a person falls upon the stretcher-like part or fender that is arranged at the rear part of the automobile or like vehicle when it moves backward.

The part which protects the pedestrian from being hurt when he approaches the moving vehicle too near from the side consists of a frame which is fastened to the mud-guard, if there is such, and which is covered with cloth or a sheet of metal, and the general shape of this screen-like frame and covering thereof is such that when seen in the vertical plane it is extended farthest to the outside where it is nearest to the center of the wheel.

In the accompanying drawing—

Figure 1 shows an automobile in elevation, with parts broken away for showing the essential part of the invention; and Figure 2 shows a top view of that automobile with its upper structure partly removed for showing the arrangement of the automatic braking devices.

The frame in front of the vehicle which may be an automobile, truck, or trolley car, or any other similar horseless vehicle, is indicated by 1 and the cloth or net which covers the frame 1 is indicated by 2. This cloth or net may be slightly sagging, but should be fastened well. The frame 1 is fastened to a bar 3 which is movably arranged in journals 4 formed by or secured to a part of the car body which, in this instance, might be the front bumper 4a. Relatively strong leaf springs 5 are so arranged that the frame 1 is held in the horizontal position. These springs 5 will yield to the pressure exerted by a person who falls upon said frame and into the net or stretcher 2. A stop 6, however, prevents the further downward moving of the stretcher. Connected to bar 3 is another bar 7 which has a similar purpose to bar 2 and part 5 of the said concurring patent application and all other mechanisms, especially those that will cause the automatic braking of the vehicle must be brought in connection therewith. Bar 7 forms on its free end a downwardly directed hook 8 that is dentated. Another hook-shaped part 9 is secured to the stop 6 and is also dentated and is so arranged that the teeth thereof face the teeth of the hook 8. A circumferentially grooved plug-shaped part 12 is inserted between part 8 and part 9 and the teeth of part 8 and part 9 correctly fit in the grooves of that plug-shaped part 12. Part 8 thus holds that plug-shaped part 12 because the pressure exerted by spring 5 against the underside of the frame 1 presses also bar 7 and part 8 downwardly, which consequently is pressed against the plug-shaped part 12 and the latter is pressed again against the part 9. Suitably fastened to this plug-shaped part 12 are strong cords or chains or wires 30 and 39. To the other end of cord, etc. 30 is fastened the leather piece 63 which might be made of another suitable material that has to stand the strain to which it will be submitted in case of an automatic stopping of the vehicle. It is preferable to fasten a metal ring 63a to that piece of leather 63 and to fasten cord 30 to another ring 30a and link the latter with ring 63a. In a similar manner will be secured also the leather piece 63' that serves in connection with the right-side rear wheel of the vehicle. For holding these two leather pieces 63 and 63' exactly in front of their respective wheels a bar 36 is employed and is held by ropes, chains, or wires 37, 38, respectively. These ropes are fastened at a suitable part near or above the center line of the axle of the rear wheels and as the frame or cover for that axle 14 is suitable for that purpose said cords 37, 38 may be fastened on top thereof. At a point between the plug-shaped part 12 and the leather piece 63 there is a ring 42 secured to the car body and the rope, etc. 30 is passed therethrough. A certain distance from and in advance of said ring 42 a plug 44 is fastened to the rope 30 and in a similar manner, but in respect to the ring 43 through which rope 39 is passed, is fastened the plug 45 to this rope 39. The leather pieces 63 and 63' are lifted and are held against the underside of the running boards 15 when the ropes 30 and 39 are forcibly stretched, which is the case when the part 12 is held by the clamp-like device 8, 9. It is to be noted therefore that the structure of the automatic braking or stopping means is hidden from the eye of the onlooker and it is therefore one of the advantages of this invention that there will not be any structural part that harms the general appearance of the vehicle.

The function is as follows when a person is struck by the vehicle. That person will in all probability fall upon the part 1 or may step upon it or kneel on it, just as the case may be in which position said person was when struck by the part 1 and through the weight added thereby from above the part 1 is moved downwardly against the pressure of spring 5. Part 7 will be lifted thereby whereby part 8 will be removed from the plug-shaped part 12, which in turn follows the pull of the tightly stretched ropes 30 and 39 and falls to the ground. The leather pieces 63, 63' fall then also to the ground, but right in front of the rear wheels which then move upon these leather pieces when the automobile, etc. was in forward motion. At the moment in which the rear wheels arrive at the center of the leather pieces 63, 63', so that these may be well under their respective wheels, the plugs 44, 45 arrive at their respective rings 42, 43. These plugs are so voluminous that they cannot pass through the rings 42, 43 and they hold therefore the ropes 30, 39, respectively, and prevent them from moving further backwards. It is thus shown that the rear wheels will not touch the ground and consequently there will not be a forward moving of the vehicle, although the rear wheels may turn rapidly. For reducing the momentum, which every vehicle has when in motion, it is advisable to roughen the underside of the leather pieces 63, 63', or to add metallic points of flat angles to them which should, however, not be so prominent as to damage the pavement of the street. The whole structure is made so that it will serve also for preventing damage to the automobile itself, because the frame 1 is so arranged with respect to the journals 4 that it will be moved down rather than up when an obstruction, such as a tree, post or pole, etc., is met by the vehicle, and, in this instance, a braking action in the form previously described will save the vehicle from greater damage.

It is also one of the objects of this invention that no damage be made to the wheels or rubber tires of the vehicle when the automatic braking or stopping action, as described, takes place.

In the event that a braking action is to ensue also when a person is struck by a vehicle which moves backward, a somewhat simplified method is employed in this instance. The stretcher-like device in the rear of the vehicle is indicated by 1' and all those parts which are similar to those described in connection with this device receive the same numeral with the addition of a prime. The ropes, chains, or wires 30', 39', however, are directly connected to the bar 36' and this bar holds a pair of brake shoes 31, 32 which are somewhat different from those referred to as the leather pieces 63, 63'. The brake shoes 31, 32 have side parts 33 which extend upwardly and which are adapted to clamp the brake shoe to the wheel or tire thereof. The underside of these brake shoes may be provided with metallic projections for insuring a quick stop of the vehicle whereby said projections will grip the ground. Besides that, the brake shoes 31, 32 are so shaped that the wheel will not likely take them around; this is also made impossible on account of the ropes, chains, or wires 37', 38' which are somewhat shorter than the ropes 37, 38. A strong braking action is therefore obtained through the pull exerted by the ropes 37', 38' upon the brake shoes 31, 32 and consequently upon the wheel rims of the rear wheels or the tires thereof when the rear vehicle wheels still turn at the moment in which the brake shoes 31 and 32 are situated in the vertical center line of these rear wheels of the vehicle.

From the description it is shown that a person who will be struck by a vehicle which is equipped with said stretcher-like device will fall upon this device and will also cause at the same time the automatic braking of the vehicle.

The parts of the frame 1 which might come in touch with said falling person should be padded with cloth or rubber (see padding material indicated by 1f in Figure 1) so that the falling person may not be injured.

What I claim is:

1. In a device on a vehicle for the protection of the pedestrian, a frame in front of the vehicle and a locking device in connection therewith, a cord attached to a flat-shaped means, the latter held by a bar in front of one of the vehicle wheels, another cord attached to a part of the vehicle and to said bar, said first-mentioned cord possessing means adapted to be held by said locking device for holding thereby said cords and also said flat-shaped means and said bar in suspended position, and this locking device adapted to release said first-mentioned cord and said flat-shaped means so that the latter falls to the ground in front of said vehicle wheel in such manner that said vehicle wheel moves upon said flat-shaped means when the vehicle is in forward motion and said frame has been pushed from above, and a means adapted to thereby hold said flat-shaped means under said vehicle wheel preventing said wheel from gripping the ground but allowing it to turn.

2. In a device on a vehicle for the protection of the pedestrian, a frame in the rear of the vehicle and a locking device in connection therewith, a cord having a means attached thereto and adapted to be held by said locking device, a brake shoe, the latter held by a bar behind one of the vehicle wheels and said cord thereby holding said bar, other cords attached to a part of the vehicle and to said bar, thus holding said bar and brake shoe suspended, said means adapted to be released by said locking device when said frame is pushed from above, said cords thereby permitting said bar and brake shoe to fall to the ground and lay there in such position that said wheel must move upon said brake shoe when the vehicle moves backwards, said second-mentioned other cords thereby stretched in such manner that the brake shoe exerts a strong pressure upon the rim of said wheel, causing thereby a strong braking of the vehicle.

HEINRICH KARL.